Aug. 7, 1934.    A. D. REDNER    1,969,033
FILTER
Filed Nov. 9, 1932
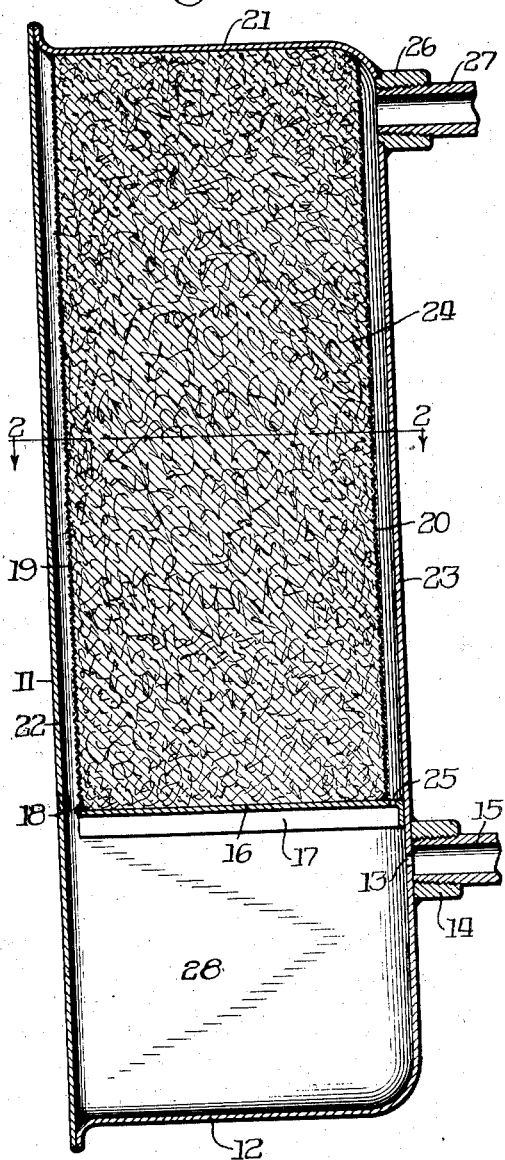
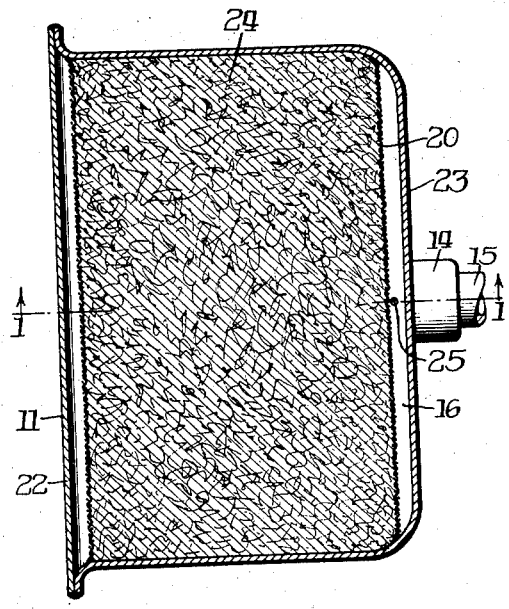
Inventor
Arthur D. Redner
By Walter M. Fuller
Atty Patented Aug. 7, 1934

1,969,033

UNITED STATES PATENT OFFICE 1,969,033

FILTER

Arthur D. Redner, Detroit, Mich., assignor to Skinner Motors, Inc., Detroit, Mich., a corporation of Delaware Application November 9, 1932, Serial No. 641,834

3 Claims. (Cl. 210—131)

My invention pertains to filters and more especially concerns appliances of that type designed and adapted to be associated with internal-combustion engines to maintain the lubricating oil thereof relatively free from deleterious substances, such as carbon, dirt, particles of metal, etc., all of which during the normal operation of the engine ordinarily find their way into the oil.

The improved and novel filter, incorporating this invention, as designed and constructed, is particularly, but not restrictedly, adapted for use in connection with the lubricating system of the internal-combustion engine of an automobile, and it is intended, during the operation of the engine, to filter its lubricating oil repeatedly to preserve it in suitable condition for the effective performance of its friction-reducing function.

The filter is of such size and shape that it may be secured to the engine or other appropriate support under the hood of the automobile, where it may be easily connected to the engine lubrication system and where it may be replaced with facility when it no longer adequately efficiently does its work.

In most automobile engines, the oil supply is housed in the lower portion of the engine crank-case, and the oil is pumped from such sump to the various parts of the engine requiring lubrication.

If a portion of such pumped oil is sent through a branch pipe system equipped with the new filter and returned to the crank-case, such continuous reclamation or purification of a part of the oil keeps the entire oil supply in sufficiently good condition, whereby it can do its work properly.

In oil-filters thus employed in connection with automobile engines, during cold weather, the oil in the filter is likely to become congealed or solidified so as to render the filter practically, if not entirely, inoperative.

One leading aim of the present invention is to provide a filter construction made in such a way that even during such cold weather the filtering-medium thereof will be operative practically or substantially all of the time.

To this end, the filter is made with a by-pass so that if the filter-element becomes temporarily inactive or clogged with oil congealed by reason of the prevailing low temperature, the warm oil from the engine crank-case flowing through the by-pass in heat-conductive relation to the filter-element raises the temperature of the latter sufficiently to render its filtering function active, whereby the oil to be treated can readily flow through it and have its contaminating or polluting solids strained or filtered out.

In order to enable those skilled in this art to understand the invention fully, both from structural and functional standpoints, in the accompanying drawing, forming a part of this specification and to which reference should be had in connection with the following detailed description, a present, preferred embodiment of the invention has been fully illustrated, and, for simplicity, like reference characters have been used to designate the same parts throughout the views.

In this drawing:—

Figure 1 is a longitudinal, vertical, central section through the new filter; and Figure 2 is a horizontal cross-section on line 2—2 of Figure 1.

By reference to such associated drawing, it will be perceived that the novel and improved filter includes a rectangular, metal casing 11 of appropriate size and formation, the exact shape being relatively immaterial.

Some distance above the bottom wall or floor 12 of this housing, an upright wall 23 thereof is provided with a metered, oil-admission opening 13 and a threaded connection 14 adapted to be joined to an oil inlet-pipe 15 through which the oil from the internal-combustion engine of the automobile is fed under pressure into the interior of the filter.

Above the opening 13, the casing is fitted with a horizontal, sheet-metal, division or partition wall 16 which may be conveniently secured in place by its depending flanges 17 being welded to the inner surfaces of the casing.

Whereas this plate is secured to three walls of the casing, a substantial space or elongated port 18 is left between the remaining edge of the plate and the complementary wall 22, which is opposite the wall 23.

Parallel, upright, metal screens 19 and 20 extend from the plate 16 to the top wall 21 of the casing, being located suitable distances from the back and front walls 22 and 23 of the casing, respectively.

The space between such two screens is filled with a suitable filtering-medium 24, preferably one of more or less fibrous nature, which is pressed into the chamber in a rather compact condition.

A metered hole 25 extends through the plate 16 between the screen 20 and the casing front wall 23, and, near the top of the filter, such front wall is supplied with a fitting 26 connected to an oil-outlet pipe 27.

The space 28 in the casing or housing below the level of the opening 13 constitutes a settling or sediment-separating compartment.

The filter works substantially as follows:

Assuming that the unfiltered oil is fed under pressure into the appliance through pipe 15 and its associated aperture 13, some of the deleterious and contaminating matter which it contains settles out in chamber 28 and the major portion of the oil passes up through the port 18, and then through screen 19, filtering medium 24, screen 20, and out through the delivery-pipe 27.

A relatively small portion of the oil flows through the opening or port 25, the upright space between elements 20 and 23, and out through the pipe 27, without being filtered, but when the filter is warm, the back-pressure which the filtering-medium 24 imposes on the oil is not sufficient to cause any objectionably large quantity of oil to traverse such by-pass without being filtered.

If during cold weather the oil in the filter-element becomes congealed or solidified, so that the filter cannot perform its straining function, the oil entering the filter from the engine crank-case, which soon becomes warm or hot after the engine starts, flows through the by-pass which is in heat-conductive relation to the filtering-medium and the congealed oil in the latter is soon liquefied so that the filter becomes promptly completely operative for doing the work which it is intended to perform, operating in the manner above specified.

One of the outstanding features of this invention is the provision of this by-pass which lets the warm oil flow through it in such a manner as to heat the filtering-material, whereby the latter cannot remain inoperative or clogged for any substantial period of time.

While I have described the new filter as particularly adapted for employment with the lubricating oil of an internal combustion engine, it is to be understood that it is not limited to that particular use, and it is to be remembered further that the invention is not restricted to the precise and exact details of structure shown and described, since these may be modified in substantial measure without departure from the heart and essence of the invention as defined by the appended claims.

I claim:

1. In a liquid filter, the combination of a casing having an inlet and an outlet, a passage-way in said casing connecting said inlet and outlet, a stationary filter-medium in said passage-way, and a constantly open by-pass connecting said inlet and outlet and in heat-conductive relation to said filter-medium, whereby if the filter-medium becomes more or less clogged with congealed or thickened liquid the heated liquid flowing through the by-pass will restore the filter-medium to operative condition.

2. In a liquid filter, the combination of a casing having an inlet above the bottom of the casing and having an outlet near the top of the casing, whereby the lower portion of the casing acts as a sediment-collecting chamber, a passage-way in said casing connecting the upper portion of said chamber and said outlet, a stationary filter-medium in said passage-way and a constantly-open by-pass connecting said inlet and outlet and in heat-conductive relation to said filter-medium, whereby if the filter-medium becomes more or less clogged with congealed or thickened liquid, the heated liquid flowing through the by-pass will restore the filter-medium to operative condition.

3. In an oil-filter, the combination of a casing having a metered inlet above the bottom of the casing and having an outlet near the top of the casing, a cross-partition in said casing above said inlet dividing said casing into a lower chamber and an upper compartment, screens extending across said compartment and from said partition to the top of the casing and spaced inwardly away from the corresponding walls of the casing, a filtering-medium occupying the space between said screens, and a port at that side of said casing opposite said inlet connecting said chamber with the space between one of said screens and its adjacent wall, said partition having a metered hole near the inlet side of said casing connecting said chamber with the space between the other screen and its adjacent wall, whereby if the filtering-medium becomes clogged with congealed oil the warm oil flowing through the by-pass from said metered hole to said outlet will liquefy such congealed oil and thereafter allow the oil to pass through said port and filtering-medium to the outlet.

ARTHUR D. REDNER.